(No Model.)

G. WENSTROM.
Match Box.

No. 229,780. Patented July 6, 1880.

WITNESSES:
Francis McArdle,
C. Sedgwick.

INVENTOR:
G. Wenstrom
BY Munn & Co
ATTORNEYS.

UNITED STATES PATENT OFFICE.

GEORG WENSTRÖM, OF STOCKHOLM, SWEDEN.

MATCH-BOX.

SPECIFICATION forming part of Letters Patent No. 229,780, dated July 6, 1880.

Application filed April 8, 1880. (No model.) Patented in Sweden February 21, 1880.

*To all whom it may concern:*

Be it known that I, GEORG WENSTRÖM, of Stockholm, Sweden, have invented a new and useful Improvement in Match-Boxes, (for which Letters Patent No. 57 were granted to me by the government of Sweden on the 21st of February, 1880,) of which the following is a specification.

The object of this invention is to facilitate the lighting of cigars in the open air and the cutting off of cigar-ends; and my invention consists in a match-box provided with a sliding cap or inner box, which is divided into two compartments—one for holding matches and the other for receiving the end of the cigar for lighting—and formed with a slit at one side for the insertion of a match within the lighting-chamber; also, in a tongue formed on the inner box, which, in connection with an opening in the outer box, forms a cutting device, combined with a chamber formed at the inside of the match-box to receive the cuttings. These features will be more particularly described with reference to the accompanying drawings, forming part of this specification, wherein—

Figure 1:
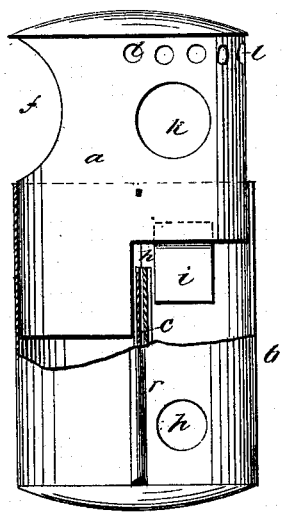
Figure 2:
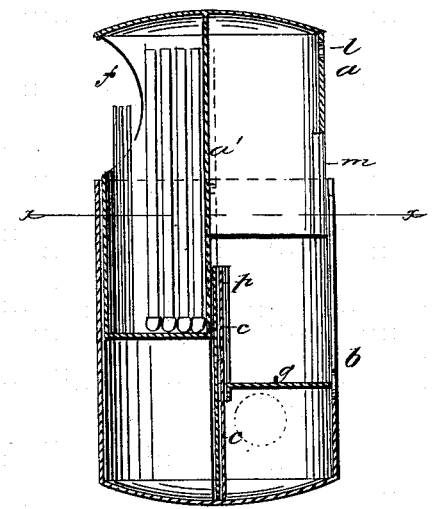
Figure 3:
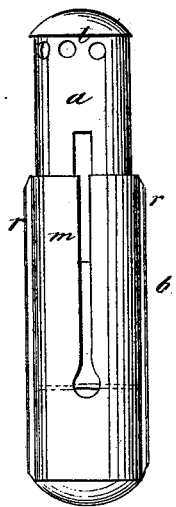
Figure 4:
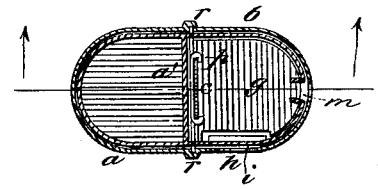

Figures 1 and 2 are sectional elevations of my improved match-box, the inner box being extended. Fig. 3 is an end elevation. Fig. 4 is a cross-section on line $x$ $x$ of Fig. 2.

Similar letters of reference indicate corresponding parts.

$a$ is the inner box or cap; $b$, the outer box. The inner box, $a$, is divided, by a partition, $a'$, lengthwise into two compartments—one for receiving matches, closed at the bottom and accessible by an opening, $f$, when the box $a$ is drawn out, and the other serving as a lighting-chamber, having a side opening, $k$, for the insertion of the lighting end of a cigar, and small openings $l$, for escape of products of combustion.

In the sides of the outer box, $b$, there are grooves $r$, in which enter lugs or pins on the sides of box $a$, and the outer ends of said grooves $r$ being closed, the outward movement of the inner box is checked by the lugs or pins on the box $a$ coming in contact with the closed ends; but when necessary to remove the inner box entirely it may be done by springing the boxes.

At the bottom of the lighting-chamber is a tongue or cutter, $i$, which, when box $a$ is pushed in, passes over an opening, $h$, in the side of box $b$, to cut the end or tip of a cigar when inserted at $h$.

In the grooves $r$ of box $b$ is fitted a plate, $c$, to which is attached at right angles a plate, $g$, so that the plates $c$ $g$ form a chamber in box $b$, beneath the opening $h$, for receiving the cigar-ends that are cut off.

The plate $c$, with $g$, may be drawn out when the box $a$ is removed, and the accumulation of cigar-ends emptied out.

Beyond the plate $g$ the plate $c$ extends into the lighting-chamber, and is formed with undercut edges $p$, for retaining a piece of flint-paper and permitting its renewal.

In the boxes $a$ $b$, at the side of the lighting-chamber, a slot, $m$, is cut, of about the width of a common match at one end and enlarged at the other end, to permit the match to be inserted and drawn over the flint-paper to ignite it.

The manner of use is as follows: The box $a$ is to be drawn out as far as permitted by the grooves $r$, a match taken from the box, its end inserted in slot $m$, and drawn over the flint-paper to ignite the match. The match will then burn within the lighting-chamber, and by inserting the cigar into the hole $k$ it may be lighted.

By this device a cigar may be lighted in the open air, even when the wind is blowing hard, as the flame is protected during the operation.

Having thus described my invention, I claim as new and desire to secure by Letters Patent—

1. The match-box consisting of the combined inner and outer boxes, $a$ $b$, fitted to slide together, and formed with the lighting-plate $c$, opening $k$, for the insertion of the lighting end of a cigar, and slot $m$, for the match, substantially as and for the purposes set forth.

2. In match-boxes, the slotted sliding inner box, $a$, divided by plate $a'$, to form a match-receptacle and a lighting-chamber, and provided with the openings $f$ $k$ $l$, combined with the slotted box $b$, substantially as shown and described.

3. In match-boxes, the sliding box $a$, formed with the cutter $i$, combined with the outer box, $b$, formed with the opening $h$, and provided with the plates $c$ $g$, substantially as and for the purposes specified.

GEORG WENSTRÖM.

Witnesses:
   NERE A. ELFWING,
   O. NYSTRÖMER.